United States Patent
Jin et al.

(10) Patent No.: US 11,968,766 B2
(45) Date of Patent: Apr. 23, 2024

(54) INDUCTION HEATING SYSTEM AND METHOD FOR SILICON STEEL CORE WITH SELF-ADHESIVE COATING

(71) Applicant: BAOSHAN IRON & STEEL CO., LTD., Shanghai (CN)

(72) Inventors: Xiaoli Jin, Shanghai (CN); Dengfeng Li, Shanghai (CN); Yueming Zhou, Shanghai (CN); Bo Wang, Shanghai (CN); Guobao Li, Shanghai (CN)

(73) Assignee: BAOSHAN IRON & STEEL CO. LTD., Shanghai (CN)

( * ) Notice: Subject to any disclaimer, the term of this patent is extended or adjusted under 35 U.S.C. 154(b) by 569 days.

(21) Appl. No.: 16/972,080

(22) PCT Filed: Aug. 2, 2019

(86) PCT No.: PCT/CN2019/099101
§ 371 (c)(1),
(2) Date: Dec. 4, 2020

(87) PCT Pub. No.: WO2020/029891
PCT Pub. Date: Feb. 13, 2020

(65) Prior Publication Data
US 2021/0227646 A1    Jul. 22, 2021

(30) Foreign Application Priority Data
Aug. 6, 2018 (CN) .......................... 201810885096.2

(51) Int. Cl.
*H05B 6/10*      (2006.01)
*B29C 65/36*     (2006.01)
(Continued)

(52) U.S. Cl.
CPC ........... *H05B 6/103* (2013.01); *B29C 65/368* (2013.01); *H05B 6/06* (2013.01); *H05B 6/14* (2013.01); *H05B 6/36* (2013.01)

(58) Field of Classification Search
CPC ........ B29C 65/368; H02K 15/12; H05B 6/06; H05B 6/103; H05B 6/14; H05B 6/36
(Continued)

(56) References Cited

U.S. PATENT DOCUMENTS 6,300,608 B2 * 10/2001 Inoh ........................ H05B 6/104
148/567
2017/0136756 A1  5/2017 Chung et al.

FOREIGN PATENT DOCUMENTS

| CN | 101376920 A | 3/2009 |
| CN | 101841216 A | 9/2010 |

(Continued)

OTHER PUBLICATIONS

Notice of Office Action received for the Korean Patent Application No. 10-2020-7035151, dated Sep. 13, 2022, 7 pages (5 pages of English Translation and 5 pages Original copy).

(Continued)

*Primary Examiner* — Quang T Van
(74) *Attorney, Agent, or Firm* — Amster, Rothstein & Ebenstein LLP (57) ABSTRACT

An induction heating system for a silicon steel core with a self-adhesive coating that includes an induction heating device having a columnar induction heating coil with a hollow cavity that carries out induction heating on a silicon steel plate at a medium frequency of 6-20 KHz. By rapid induction heating at a medium frequency, a silicon steel core with a self-adhesive coating can be rapidly cured, thereby greatly shortening the processing time, improving production efficiency, and facilitating automated operation in the (Continued)

production of a silicon steel core with a self-adhesive coating. The system also ensures the quality of the cured core products that can be widely applied in the field of the production of silicon steel cores with a self-adhesive coating.

10 Claims, 7 Drawing Sheets (51) Int. Cl.
  *H05B 6/06* (2006.01)
  *H05B 6/14* (2006.01)
  *H05B 6/36* (2006.01)
(58) Field of Classification Search
  USPC .............. 219/619, 216, 497, 494, 482, 501; 399/328, 329, 330, 331, 333, 67, 69
  See application file for complete search history.

(56) References Cited

FOREIGN PATENT DOCUMENTS

| CN | 103117630 A | 5/2013 |
| CN | 107947507 A | 4/2018 |
| CN | 108023447 A | 5/2018 |
| JP | S63290145 A | 11/1988 |
| JP | 2003064414 A | 3/2003 |
| JP | 2006196855 A | 7/2006 |
| JP | 4345480 B2 | 10/2009 |
| KR | 101669513 B1 | 10/2016 |

OTHER PUBLICATIONS

English translation of the International Search Report dated Nov. 4, 2019 and English translation of the Written Opinion in corresponding International Application PCT/CN2019/099101.

First Office Action received for the Chinese Patent Application No. 201810885096.2, dated Dec. 24, 2020, 15 pages (5 pages of English Translation and 10 pages of Original Copy).

Second Office Action received for the Chinese Patent Application No. 201810885096.2, dated May 10, 2021, 14 pages (6 pages of English Translation and 8 pages of Original Copy).

Notice of Decision to Grant received for the Chinese Patent Application No. 201810885096.2, dated Sep. 27, 2021, 3 pages (2 pages of English Translation and 1 page of Original Copy).

Extended European Search Report received for the European Patent Application No. 19848476.8, dated Aug. 3, 2021, 9 pages.

First Office Action received for the Japanese Patent Application No. 2020- 572926, dated Feb. 22, 2022, 9 pages (5 pages of English Translation and 4 pages of Original Copy).

* cited by examiner

INDUCTION HEATING SYSTEM AND METHOD FOR SILICON STEEL CORE WITH SELF-ADHESIVE COATING

RELATED APPLICATIONS

The present application is a United States national phase application under 35 USC § 371 of PCT/CN2019/099101 filed 2019 Aug. 02, which claims the benefit of CN 201810885096.2 filed 2018 Aug. 06, the disclosures of which are hereby incorporated by reference in their entireties.

TECHNICAL FIELD

The present invention relates to a system and method, in particular to a heating system and method.

BACKGROUND

Stacking forming methods of modern mass-produced motor cores mainly include bolted connection, welding, riveting and adhering. In the adhering mode, silicon steel plates coated with a self-adhesive coating are assembled by surface-fixing to one another, which provides the stacking forming process with the advantages of no pollution, high core fixing strength, low magnetic vibration noise, and high core efficiency. It is especially suitable for situations where other fixing methods will cause distortion or insufficient rigidity, and where riveting or welding is inconvenient.

The current conventional application guidance for silicon steel plates with a self-adhesive coating includes: taking out, as a whole, a core (actually separate plates at that time) punched by a punching machine, placing the core on a clamp under a pressure of 6-30 bar, conveying the core to a heating furnace and heating at 150-220☐ for 1-4 hr, taking out the core after being cooled, and removing overflowing edges, and thereby a finished core product is obtained. Such process steps lead to relatively low production efficiency, need frequent manual interventions, and cannot achieve fast and continuous automatic operations, thereby resulting in high energy consumption and production operation cost. Not only that, cured silicon steel cores in different batches are different inadhering strength, differences in core thickness, and extruded overflowing edges, and the production stability is not good. Therefore, in the prior art, some researchers have made relevant improvements on stack tooling for increasing production efficiency and improving the curing quality and stability of a core with a self-adhesive coating. However, as the curing and heat preservation time of the core with a coating is not changed, the whole process of core curing from heating in a furnace, heat preservation to cooling and leaving the furnace takes generally about 10 hr, and the efficiency is still low as compared with other silicon steel products with a coating.

In the prior art, some researchers have found that if a silicon steel plate core with a self-adhesive coating is quickly heated to a target temperature in a short time, and a corresponding temperature distribution requirement is met thereby, a good adhesive curing effect can also be achieved. Japanese patent publication No. JPH11187626A proposes to rapidly heat a self-adhesive core via a high-frequency electromagnetic field formed by a high-frequency microwave, and proposes an emission source of a high-frequency microwave and a structure of related heating equipment.

However, the inventor of the present application has found that a high-frequency induction heating method can only be used to heat a silicon steel plate stack with a small size. As the size of a silicon steel plate increases, a heating area is mainly concentrated in a very narrow area of a surface layer of the silicon steel plate due to a skin gathering effect of induction heating, and in a diameter direction of the silicon steel plate, the surface can reach a high temperature instantly, while the interior is mainly heated by heat conduction inward from the surface, such that the internal temperature is relatively low compared with the temperature of the surface, resulting in a big difference in adhering performance between the surface and a core area of the silicon steel plate stack. Therefore, high-frequency induction heating cannot achieve effective heating of large silicon steel plates, and cannot cover a wide range of silicon steel plate specifications.

Induction heating is a method that can achieve efficient and rapid heating. However, the frequency selection has a crucial influence on the heating effect. If a lower frequency is selected, the depth of skin gathering layer of an induction heating eddy current can be increased, but the heating efficiency is lower. If a higher frequency is selected, the depth of skin gathering layer is reduced, and the heating efficiency is higher, but the temperature difference between the surface and the interior of the heated work piece during heating is greater.

In view of this, it is desired to obtain an induction heating system capable of rapidly curing a silicon steel core with a self-adhesive coating and ensuring the curing quality of core products, thereby being widely applicable to the field of the production of silicon steel cores with a self-adhesive coating.

SUMMARY

One objective of the present invention is providing an induction heating system for rapid curing of a silicon steel core with a self-adhesive coating, the system being capable of rapidly curing a silicon steel core with a self-adhesive coating and ensuring the curing quality of core products and increasing production efficiency, thereby being widely applicable to the field of the production of silicon steel cores with a self-adhesive coating.

To achieve the above objective, the present invention provides an induction heating system for a silicon steel core with a self-adhesive coating. The system includes: an induction heating device, which includes a columnar induction heating coil with a hollow cavity, wherein the induction heating coil carries out induction heating on a silicon steel plate at a medium frequency of 6-20 KHz.

In the technical solution of the present invention, the use of the induction heating coil with a medium frequency of 6-20 KHz for induction heating on a silicon steel plate is applicable to a wide range of silicon steel plate specifications. Considering both rapid curing and ensuring the curing quality of core products, an outer diameter of the silicon steel plate is preferably Φ50-400 mm, more preferably Φ50~300 mm.

Further, the induction heating system of the present invention greatly shortens the curing time of the silicon steel plates, and provides a possibility for automatic production of a silicon steel core with a self-adhesive coating. Therefore, the present invention further provides an induction heating system capable of achieving automatic processing, the system further including: a conveying roller table, with a plurality of stacking mold being conveyed thereon, the stacking mold being used for placing stacked silicon steel plates therein;

an induction heating device, further including a temperature measuring element for measuring the temperature of the silicon steel plates;

a feeding and discharging device, which conveys the stacking mold in a horizontal direction;

a loading and unloading device, which is configured to convey the stacking mold in the horizontal direction to a position directly below the induction heating coil, and convey the stacking mold in a vertical direction into the hollow cavity of the induction heating device or moving the stacking mold out of the hollow cavity after the induction heating is completed; and a control device, which is connected with the conveying roller table, the feeding and discharging device and the loading and unloading device, respectively, to control respective operations thereof; and is also connected with the induction heating coil and the temperature measuring element to control an induction heating process. In the technical solution of the present invention, the temperature measuring element is used for measuring the temperature of the silicon steel plates. In some embodiments, the induction heating device may further include an induction heating device support, so that the induction heating coil and the temperature measuring element may be placed on the induction heating device support. In addition, as the loading and unloading device is configured to convey the stacking mold in the horizontal direction to a position directly below the induction heating coil, and convey the stacking mold in the vertical direction into the hollow cavity of the induction heating device, accurate positioning of the stacking mold is achieved, so that the induction heating coil can accurately heat the silicon steel plates placed inside the stack mold. In addition, as the control device is connected with the conveying roller table, the feeding and discharging device and the loading and unloading device, respectively, to control respective operations thereof, and is also connected with the induction heating coil and the temperature measuring element to control an induction heating process, rapid curing and efficient automated production of the silicon steel core with a self-adhesive coating are achieved, and production efficiency is improved. It should be noted that in some embodiments, the stacking mold may be made of a nonmetal material.

Further, in the induction heating system of the present invention, the feeding and discharging device includes a cantilever beam extending in the horizontal direction, and a manipulator capable of walking along the cantilever beam.

In the technical solution of the present invention, in some embodiments, walking and clamping operations of the manipulator may be controlled by a servo motor. In addition, the cantilever beam may be mounted to a support for placing the conveying roller table.

Still further, in the induction heating system of the present invention, a conveying direction of the conveying roller table and a conveying direction of the feeding and discharging device are perpendicular to each other.

Further, in the induction heating system of the present invention, the temperature measuring element is an infrared temperature measuring element.

Further, in the induction heating system of the present invention, the temperature measuring element is arranged at a middle part of the induction heating coil.

Further, in the induction heating system of the present invention, the loading and unloading device includes:

a support;

a vertical displacement adjusting element, which is arranged on the support and connected with the control device;

a base plate, which is connected with the vertical displacement adjusting element and driven by the vertical displacement adjusting element to move in the vertical direction;

a horizontal movable plate, which is arranged on the base plate and connected with the control device, the horizontal movable plate being configured to be slidable in the horizontal direction relative to the base plate;

a stacking mold seat, which is arranged on the horizontal movable plate, for placing the stacking mold.

In the technical solution of the present invention, the horizontal movable plate is arranged on the base plate and connected with the control device, and the horizontal movable plate is configured to be slidable in the horizontal direction relative to the base plate, so that the loading and unloading device can convey the stacking mold in the horizontal direction to a position directly below the induction heating coil. The vertical displacement adjusting element is arranged on the support and is connected with the control device, so that the loading and unloading device can convey the stacking mold in the vertical direction into the hollow cavity of the induction heating device or moving the stacking mold out of the hollow cavity after the induction heating is completed. In some embodiments, the stacking mold seat may be made of a nonmetal material.

Further, in the induction heating system of the present invention, the stacking mold seat is provided with a pressure sensor, and the pressure sensor is connected with the control device.

In the technical solution of the present invention, the stacking mold seat is provided with a pressure sensor to detect a pressure on the stacking mold seat in real time, and the pressure sensor is connected with the control device, so that the control device controls a compaction degree of the silicon steel plates based on a pressure value transmitted by the pressure sensor.

Further, in the induction heating system of the present invention, the induction heating system further includes:

a distance measuring element, which is arranged above the induction heating coil and connected with the control device, wherein the distance measuring element detects a distance between the distance measuring element and the silicon steel plates inside the stacking mold, and transmits the distance to the control device; and based on a signal transmitted by the distance measuring element, the control device controls a distance that the loading and unloading device conveys the stacking mold in the vertical direction, and controls a distance that a compaction disk moves in the vertical direction;

a compacting force adjusting element, which is arranged above the induction heating coil and connected with the control device; the compaction disk, which is connected with the compacting force adjusting element, wherein based on the control of the control device, under the adjustment of the compacting force adjusting element, the compaction disk moves vertically downward and applies a pressure to the silicon steel plates inside the stacking mold, or moves vertically upward to release the silicon steel plates.

In the technical solution of the present invention, in some embodiments, the induction heating device may further include a fixing rod connected with the induction heating device support, and the compacting force adjusting element may be connected with the fixing rod, so that the compacting three adjusting element is mounted to the induction heating device support through the fixing rod. The distance measuring element is connected with the compacting force adjusting element so as to be mounted to the induction heating device support through the compacting force adjusting element. In addition, in some embodiments, the compaction disk may be made of a nonmetal material.

Correspondingly, another objective of the present invention is providing an induction heating method for rapid curing of a silicon steel core with a self-adhesive coating, the method being capable of rapidly curing a silicon steel core with a self-adhesive coating and ensuring the curing quality of core products and increasing production efficiency, thereby being widely applicable to the field of the production of silicon steel cores with a self-adhesive coating.

To achieve the above objective, the present invention provides an induction heating method for rapid curing of a silicon steel core with a self-adhesive coating, wherein an induction heating coil is used to carry out induction heating on stacked silicon steel plates at a medium frequency of 6-20 KHz.

Further, the induction heating method for rapid curing of a silicon steel core with a self-adhesive coating provided by the present invention includes the following steps: compacting the stacked silicon steel plates, carrying out induction heating, by the induction heating coil, on the stacked silicon steel plates at a medium frequency of 6-20 KHz, and measuring the temperature of the silicon steel plates in real time, and stopping heating by the induction heating coil when the silicon steel plates reach a target heating temperature.

In the present invention, heating can be stopped whenever the silicon steel plates reach the target heating temperature, thereby greatly shortening the heating time of the silicon steel core with a self-adhesive coating.

Correspondingly, yet another objective of the present invention is a method for heating silicon steel plates by using the above-mentioned induction heating system, the method being capable of rapidly curing a silicon steel core with a self-adhesive coating and ensuring the curing quality of core products and increasing production efficiency, thereby being widely applicable to the field of the production of silicon steel cores with a self-adhesive coating.

To achieve the above objective, the present invention provides an induction heating method for rapid curing of a silicon steel core with a self-adhesive coating, wherein the induction heating system of the present invention is used to carry out induction heating on silicon steel plates stacked inside a stacking mold.

In the technical solution of the present invention, in some embodiments, a process of induction heating on silicon steel plates stacked inside a stacking mold by using the induction heating system of the present invention may be as follows:

(1) Before induction heating on the silicon steel plates, relevant parameters and initial values are set first, including a target heating temperature of the silicon steel plates, a target compressive stress value applied to the silicon steel plates, an initial position of the horizontal movable plate, an initial position of the vertical displacement adjusting element, and an initial position of the compaction disk.

(2) After the silicon steel plates are stacked inside the stacking mold, the stacking mold and the silicon steel plates together are placed on the conveying roller table, and conveyed to an induction heating operation area through the conveying roller table. The conveying roller table may adopt step-by-step transmission. When the stacking mold and the silicon steel plates arrive at the induction heating operation area, the conveying roller table suspends operation, and the manipulator of the feeding and discharging device clamps the stacking mold, and the stacking mold and the silicon steel plates together are carried to the stacking mold seat of the loading and unloading device by the cantilever beam. At that time, the feeding and discharging device completes a feeding operation. The pressure sensor on the stacking mold seat sends a real-time compressive stress value to the control device, and the control device obtains an initial compressive stress value.

(3) The horizontal movable plate conveys the stacking mold and the silicon steel plates to a position directly below an induction heating station to achieve precise concentric positioning. At that time, the distance measuring element detects a distance from the silicon steel plates, and sends data to the control device, and the control device calculates a stacked thickness of the silicon steel plates, an amount of displacement that the vertical displacement adjusting element needs to ascend, and a height that the compacting force adjusting element needs to descend, and sends the same to the vertical displacement adjusting element and the compacting force adjusting element respectively. The vertical displacement adjusting element executes a loading operation according to an instruction from the control device, and raises the stacking mold and the silicon steel plates to a middle position of the induction heating coil. Then, the compacting force adjusting element executes an instruction of the control device, and lowers the compaction disk to a designated position. Subsequently, the control device calculates a difference between the compressive stress value measured by the pressure sensor in real time and the initial compressive stress value, and sends a descending instruction to the compacting force adjusting element to adjust a descending height of the compaction disk and compact the stacked silicon steel plates until the compressive stress value reaches the set target compressive stress value, and the position of the compaction disk is locked. At that time, loading and compacting operations are completed.

(4) The induction heating coil carries out induction heating on the silicon steel plates at an intermediate frequency of 6-20 KHz, and the temperature measuring element measures the temperature of the silicon steel plates in real time. When the silicon steel plates reach the target heating temperature, the induction heating coil stops heating. The compacting force adjusting element raises the compaction disk to the initial position of the compaction disk, and the vertical displacement adjusting element descends to its initial position. At that time, an unloading operation is completed.

(5) The horizontal movable plate moves from a position directly below the induction heating station to the initial position of the horizontal movable plate, and the manipulator takes out the stacking mold and the silicon steel plates from the stacking mold seat, and the cantilever beam carries the same to the conveying roller table. At that time, a discharging operation is completed.

Rapid induction heating and self-adhesive curing of the silicon steel plates are accomplished by the above-mentioned steps, and the conveying roller table continues operation, and the next round of treatment on silicon steel plates may be carried out by repeating the above-mentioned steps.

Compared with the prior art, the induction heating system and method for rapid curing of a silicon steel core with a self-adhesive coating have the following beneficial effects:

By means of rapid induction heating at a medium frequency, the induction heating system for rapid curing of a silicon steel core with a self-adhesive coating of the present invention can rapidly cure a silicon steel core with a self-adhesive coating, and can ensure the curing quality of core products and increase production efficiency, thereby being widely applicable to the field of the production of silicon steel cores with a self-adhesive coating.

DETAILED DESCRIPTION

An induction heating system and method for rapid curing of a silicon steel core with a self-adhesive coating of the present invention is further explained and described below in conjunction with the drawings and specific embodiments. However, the explanation and description do not improperly limit the technical solutions of the present invention.

Figure 1:
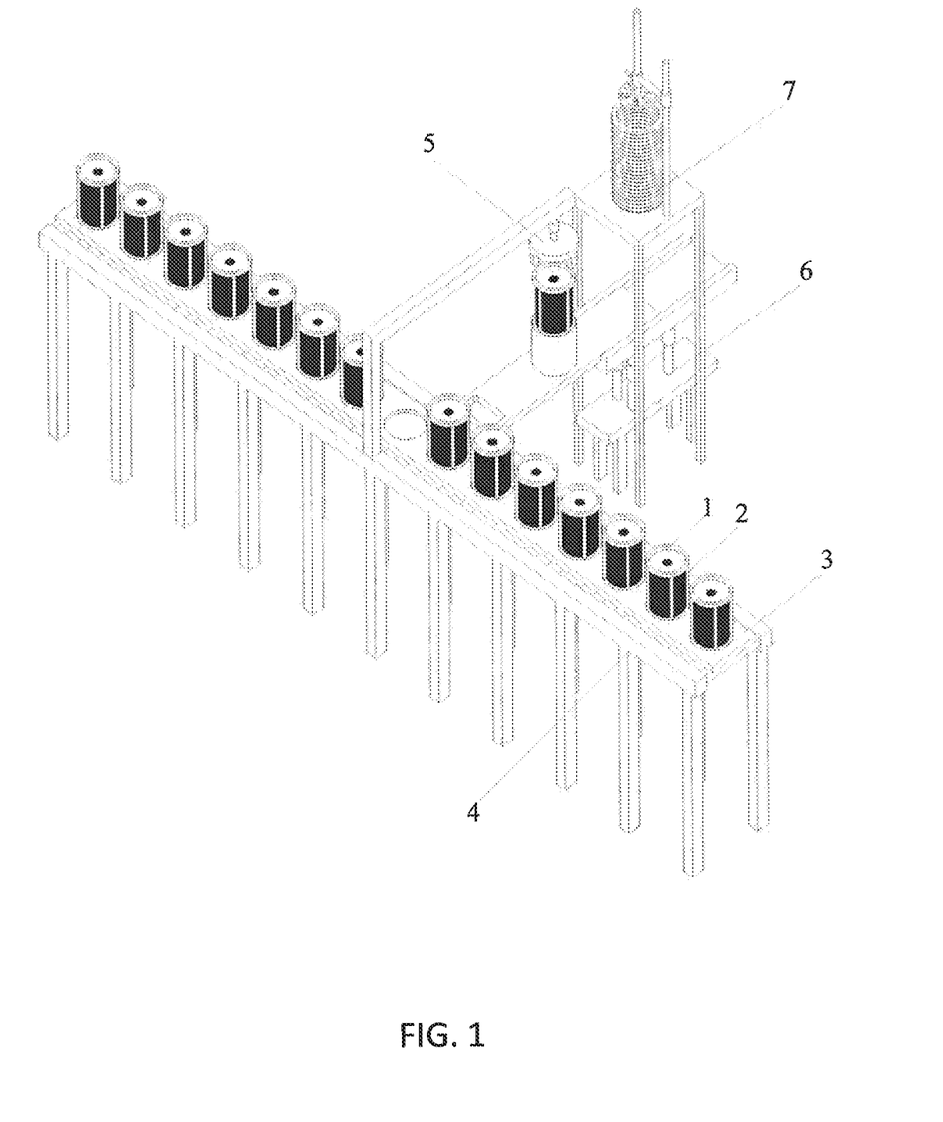
FIG. 1 is a structural diagram of an induction heating system for rapid curing of a silicon steel core with a self-adhesive coating of the present invention in a feeding state in some embodiments.
Figure 2:
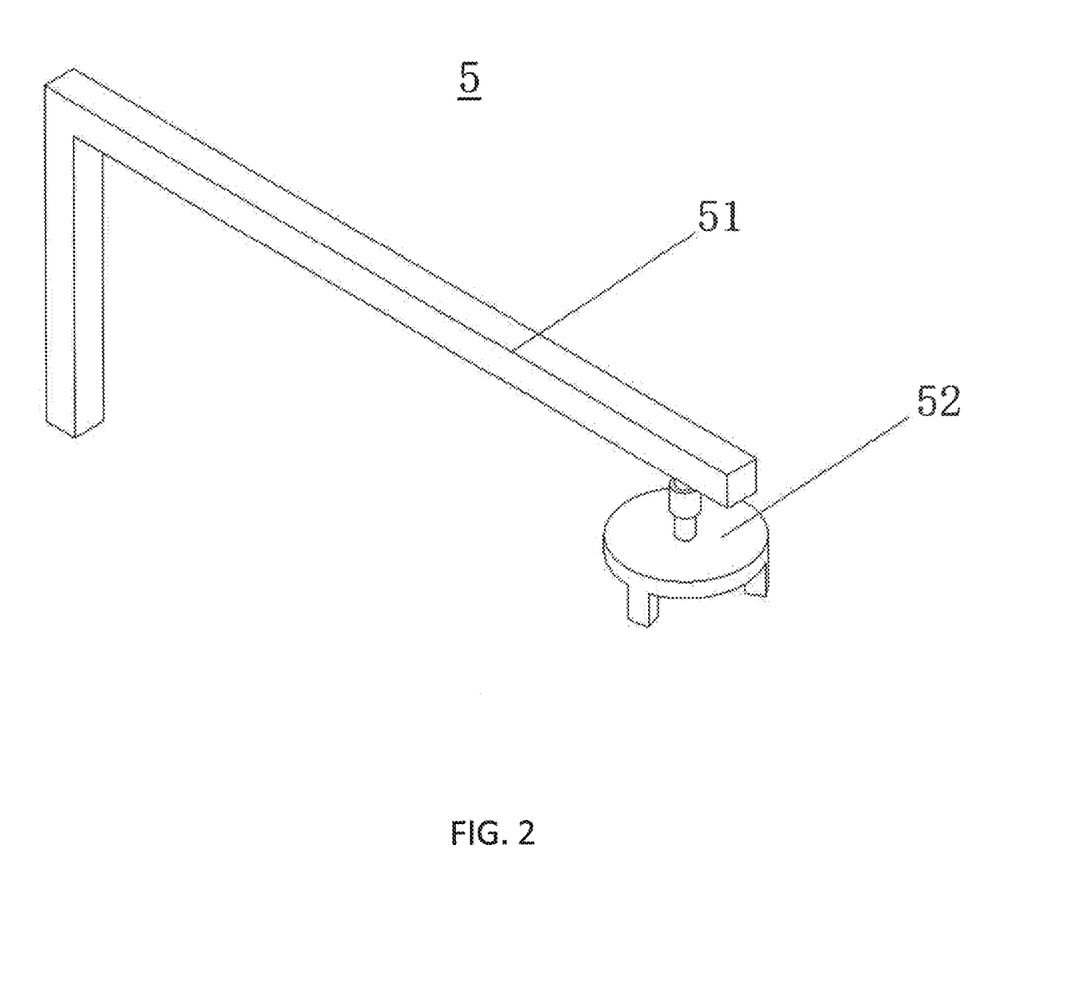
FIG. 2 is a structural diagram of a feeding and discharging device in some embodiments, in the induction heating system for rapid curing of a silicon steel core with a self-adhesive coating of the present invention.
Figure 3:
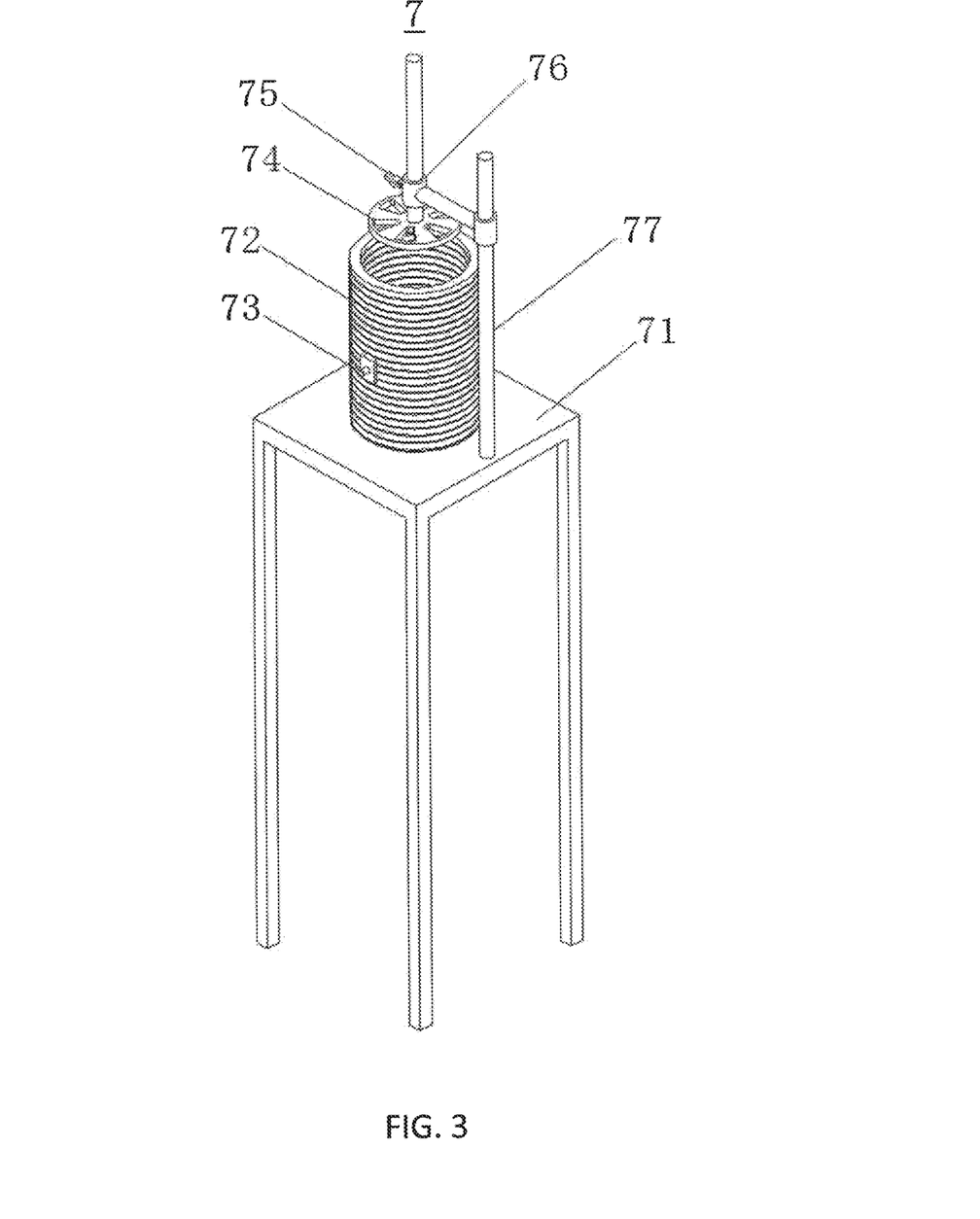
FIG. 3 is a structural diagram of an induction heating device in some embodiments, in the induction heating system for rapid curing of a silicon steel core with a self-adhesive coating of the present invention.
Figure 4:
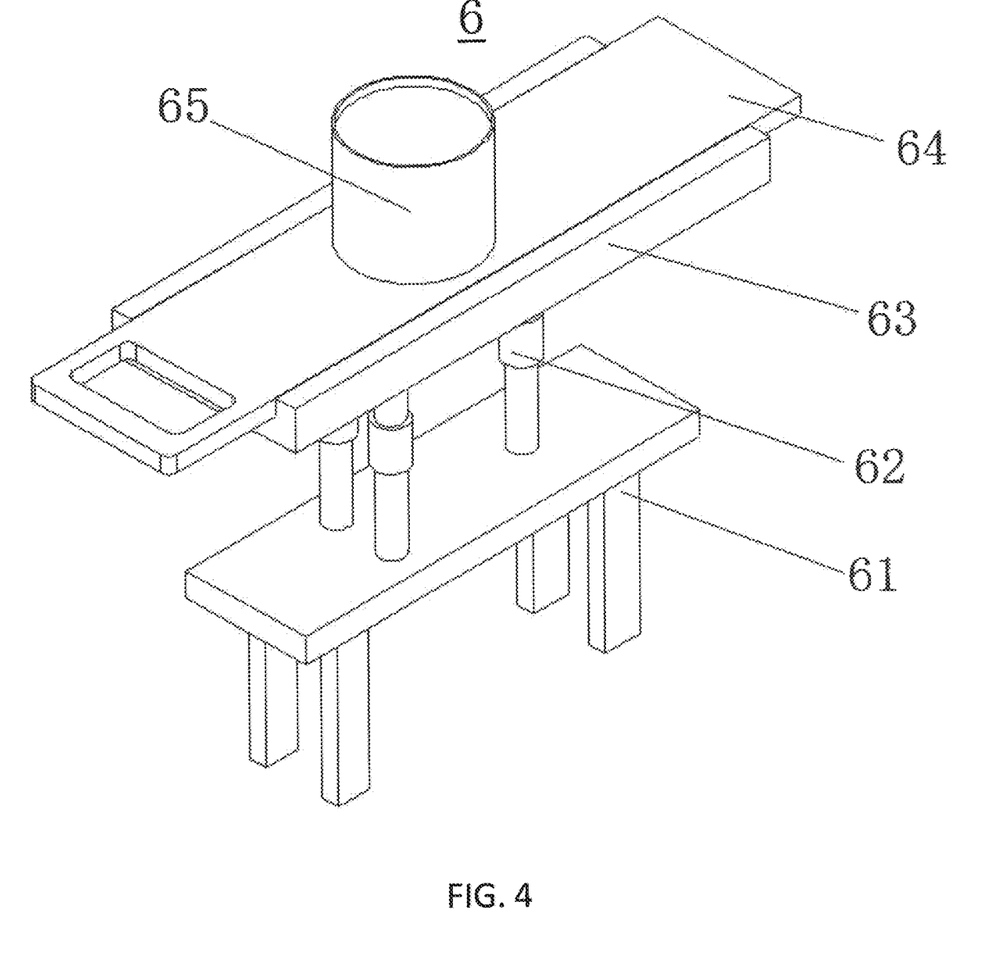
FIG. 4 is a structural diagram of a loading and unloading device in some embodiments, in the induction heating system for rapid curing of a silicon steel core with a self-adhesive coating of the present invention.

FIG. 1 is a structural diagram of the induction heating system for rapid curing of a silicon steel core with a self-adhesive coating of the present invention in a feeding state in some embodiments. FIG. 2 is a structural diagram of the feeding and discharging device in some embodiments, in the induction heating system for rapid curing of a silicon steel core with a self-adhesive coating of the present invention. FIG. 3 is a structural diagram of an induction heating device in some embodiments, in the induction heating system for rapid curing of a silicon steel core with a self-adhesive coating of the present invention. FIG. 4 is a structural diagram of a loading and unloading device in some embodiments, in the induction heating system for rapid curing of a silicon steel core with a self-adhesive coating of the present invention.

As shown in FIG. 1, in some embodiments, the induction heating system for rapid curing of a silicon steel core with a self-adhesive coating in the present invention may include: a conveying roller table 3, a conveying roller table support 4, an induction heating device 7, a feeding and discharging device 5, a loading and unloading device 6 and a control device (not shown in the figure). A plurality of stacking molds 2 (made of a nonmetal material) are conveyed on the conveying roller table 3, and the stacking molds 2 are used for placing stacked silicon steel plates 1 therein, a conveying direction of the conveying roller table 3 and a conveying direction of the feeding and discharging device 5 being perpendicular to each other. The control device is connected with the conveying roller table 3, the feeding and discharging device 5 and the loading and unloading device 6, respectively, to control respective operations thereof.

Further referring to FIGS. 2, 3 and 4, in some embodiments, the feeding and discharging device 5 conveys the stacking mold 2 along a horizontal direction, and includes a cantilever beam 51 mounted to the conveying roller table support 4 and extending in the horizontal direction, and a manipulator 52 capable of walking along the cantilever beam 51. In some embodiments, walking and clamping operations of the manipulator 52 may be controlled by a servo motor.

In addition, it can be seen that the induction heating device 7 includes an induction heating device support 71, a columnar induction heating coil 72 with a hollow cavity, a temperature measuring element 73, a compaction disk 74, a distance measuring element 75, a compacting force adjusting element 76 and a fixing rod 77. The induction heating coil 72 and the temperature measuring element 73 are placed on the induction heating device support 71, and the induction heating coil 72 carries out induction heating on the silicon steel plates 1 at an intermediate frequency of 6-20 KHz. The temperature measuring element 73 is used to measure the temperature of the silicon steel plates 1, and is arranged at a middle part of the induction heating coil 72. In some embodiments, the temperature measuring element 73 may be an infrared temperature measuring element. The induction heating coil 72 and the temperature measuring element 73 are connected with the control device to control an induction heating process through the control device. The distance measuring element 75 is arranged above the induction heating coil 72, and is connected with the compacting force adjusting element 76 so as to be mounted to the induction heating device support 71 through the compacting force adjusting element 76. In addition, the distance measuring element 75 is connected with the control device and the distance measuring element 75 detects a distance between the distance measuring element and silicon steel plates 1 inside a stacking mold 2, and transmits the same to the control device; and based on a signal transmitted by the distance measuring element 75, the control device controls a distance that the loading and unloading device 6 conveys the stacking mold 2 in a vertical direction, and controls a distance that the compaction disk 74 moves in the vertical direction. The compacting force adjusting element 76 is arranged above the induction heating coil 72, and is connected with the fixing rod 77, so that the compacting force adjusting element 76 is mounted to the induction heating device support 71 through the fixing rod 77, and the compacting force adjusting element 76 is connected with the control device. The compaction disk 74 is connected with the compacting force adjusting element 76, and based on the control of the control device, under the adjustment of the compacting force adjusting element 76, the compaction disk 74 moves vertically downward and applies a pressure to the silicon steel plates 1 inside the stacking mold 2, or moves vertically upward to release the silicon steel plates 1. In some embodiments, the compaction disk 74 may be made of a nonmetal material.

In addition, the loading and unloading device 6 includes a support 61, a vertical displacement adjusting element 62, a base plate 63, a horizontal movable plate 64 and a stacking mold seat 65. The vertical displacement adjusting element 62 is arranged on the support 61 and is connected with the control device, so that the loading and unloading device 6 is capable of conveying the stacking mold 2 in the vertical direction into the hollow cavity of the induction heating device 7 or moving the stacking mold out of the hollow cavity after the induction heating is completed. The base plate 63 is connected with the vertical displacement adjusting element 62 and driven by the vertical displacement adjusting element 62 to move in the vertical direction. The horizontal movable plate 64 is arranged on the base plate 63, and is connected with the control device. The horizontal movable plate 64 is configured to be slidable in the horizontal direction relative to the base plate 63, so that the loading and unloading device 6 can convey the stacking mold 2 in the horizontal direction to a position directly below the induction heating coil 72. The stacking mold seat 65 is arranged on the horizontal movable plate 64, for placing the stacking mold 2, and is made of a nonmetal material in some embodiments. The stacking mold seat 65 is provided with a pressure sensor (not shown in the figure) to detect a pressure on the stacking mold seat 65 in real time, and the pressure sensor is connected with the control device, so that the control device controls a compaction degree of the silicon steel 1 based on a pressure value transmitted by the pressure sensor.

Figure 5:
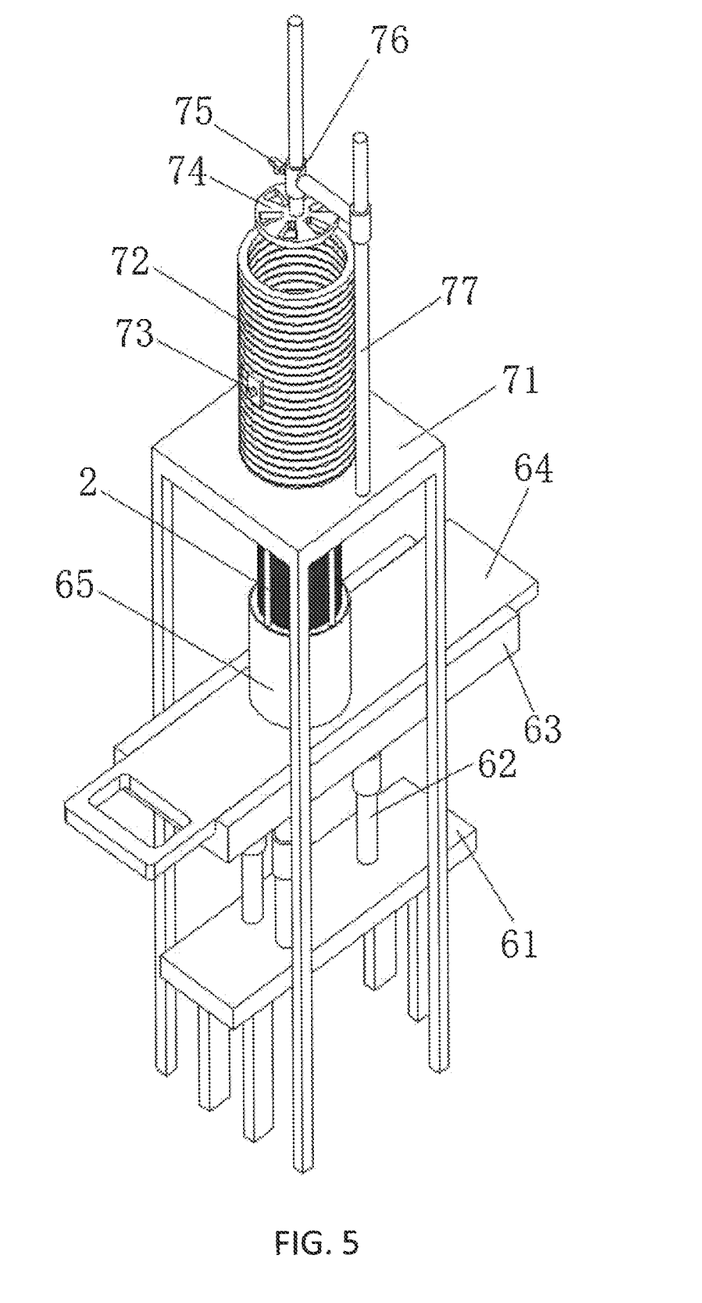
FIG. 5 is a structural diagram of the loading and unloading device in a loading initial state in Kline embodiments, in the induction heating system for rapid curing of a silicon steel core with a self-adhesive coating of the present invention.
Figure 6:
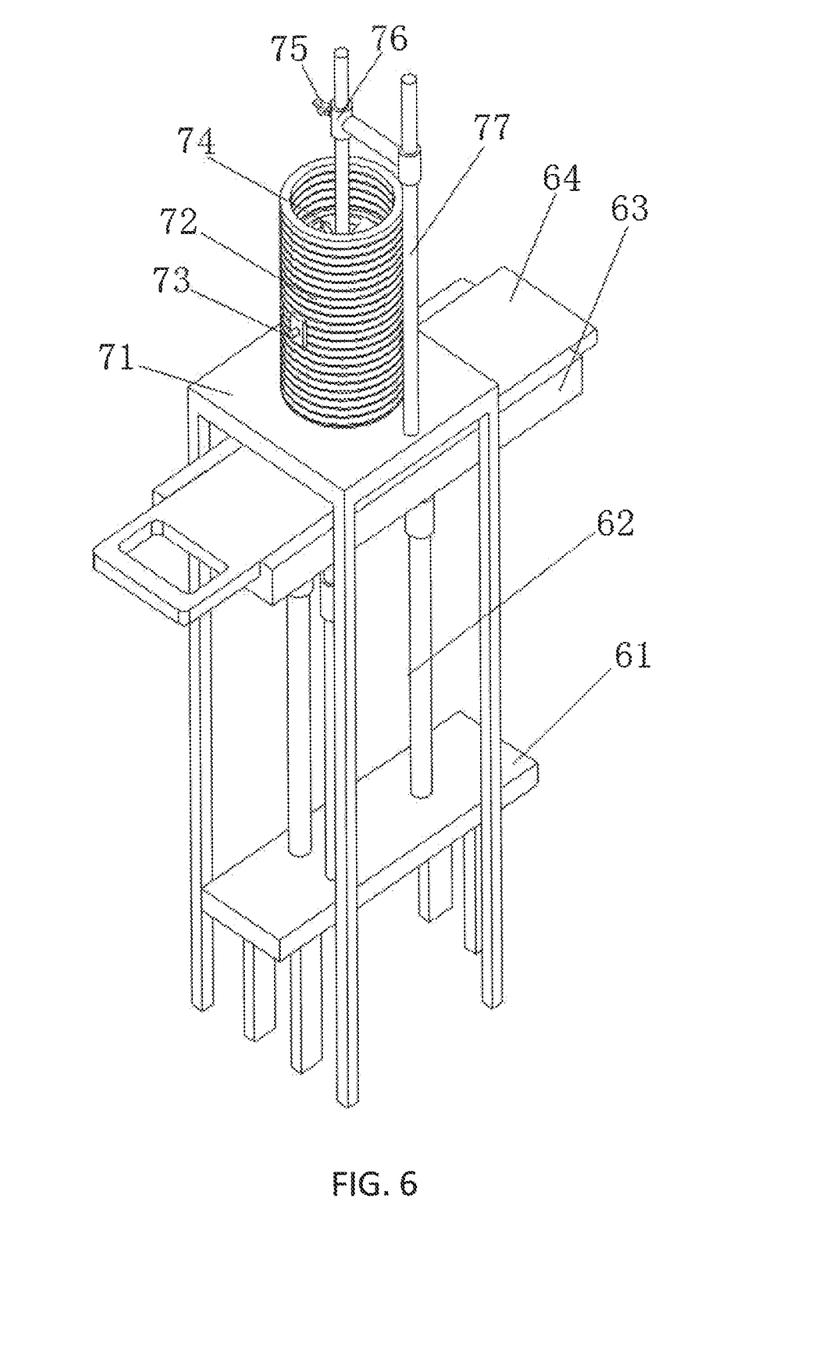
FIG. 6 is a structural diagram of the loading and unloading device in a loading completed state in some embodiments, in the induction heating system for rapid curing of a silicon steel core with a self-adhesive coating of the present invention.
Figure 7:
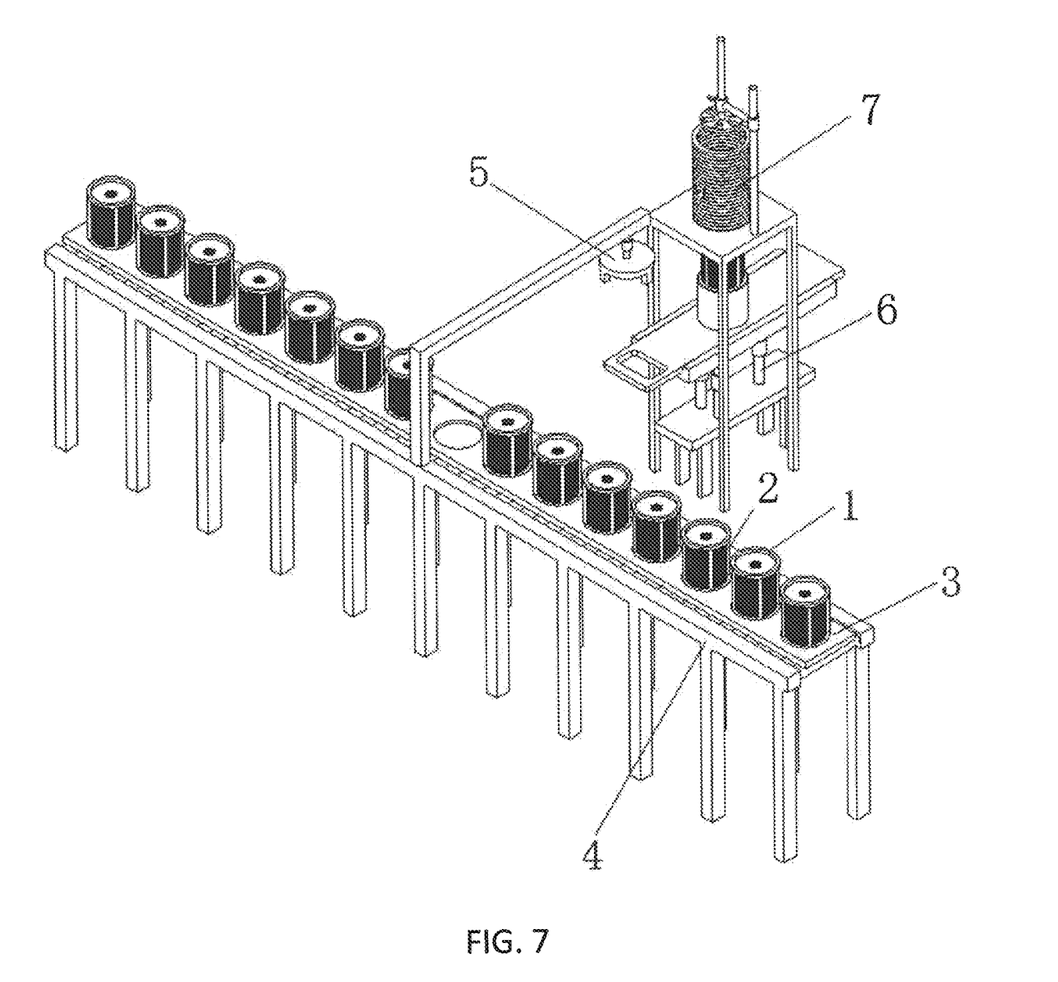
FIG. 7 is a structural diagram of the induction heating system for rapid curing of a silicon steel core with a self-adhesive coating of the present invention in a loading initial state in some embodiments.

FIG. 5 is a structural diagram of the loading and unloading device in a loading initial state in some embodiments, in the induction heating system for rapid curing of a silicon steel core with a self-adhesive coating of the present invention. FIG. 6 is a structural diagram of the loading and unloading device in a loading completed state in some embodiments, in the induction heating system for rapid curing of a silicon steel core with a self-adhesive coating of the present invention. FIG. 7 is a structural diagram of the induction heating system for rapid curing of a silicon steel core with a self-adhesive coating of the present invention in a loading initial state in some embodiments.

Referring to FIGS. 1, 2, 5, 6 and 7, in some embodiments, a process of induction heating on silicon steel plates stacked inside a stacking mold by using the induction heating system of the present invention may be as follows:

(1) Before induction heating on the silicon steel plates 1, relevant parameters and initial values are set first, including a target heating temperature of the silicon steel plates 1, a target compressive stress value applied to the silicon steel plates 1, an initial position of the horizontal movable plate 64, an initial position of the vertical displacement adjusting element 62, and an initial position of the compaction disk 74.

(2) After the silicon steel plates 1 are stacked inside the stacking mold 2, the stacking mold 2 and the silicon steel plates 0 together are placed on the conveying roller table 3, and conveyed to an induction heating operation area through the conveying roller table 3. The conveying roller table 3 may adopt step-by-step transmission. When the stacking mold 2 and the silicon steel plates 1 arrive at the induction heating operation area, the conveying roller table 3 suspends operation, and the manipulator 52 of the feeding and discharging device 5 clamps the stacking mold 2, and the stacking mold 2 and the silicon steel plates 1 together are carried to the stacking mold seat 65 of the loading and unloading device 6 by the cantilever beam 51. At that time, the feeding and discharging device 5 completes a feeding operation. The pressure sensor on the stacking mold seat 65 sends a real-time compressive stress value to the control device, and the control device obtains an initial compressive stress value.

(3) The horizontal movable plate 64 conveys the stacking mold 2 and the silicon steel plates 1 to a position directly below an induction heating station to achieve precise concentric positioning. At that time, the distance measuring element 75 detects a distance from the silicon steel plates 1, and sends data to the control device, and the control device calculates a stacked thickness of the silicon steel plates 1, an amount of displacement that the vertical displacement adjusting element 62 needs to ascend, and a height that the compacting force adjusting element 76 needs to descend, and sends the same to the vertical displacement adjusting element 62 and the compacting force adjusting element 76 respectively. The vertical displacement adjusting element 62 executes a loading operation according to an instruction from the control device, and raises the stacking mold 2 and the silicon steel plates 1 to a middle position of the induction heating coil 72. Then, the compacting force adjusting element 76 executes an instruction of the control device, and lowers the compaction disk 74 to a designated position. Subsequently, the control device calculates a difference between the compressive stress value measured by the pressure sensor in real time and the initial compressive stress value, and sends a descending instruction to the compacting force adjusting element 76 to adjust a descending height of the compaction disk 74 and compact the stacked silicon steel plates 1 until the compressive stress value reaches the set target compressive stress value, and the position of the compaction disk 74 is locked. At that time, loading and compacting operations are completed.

(4) The induction heating coil 72 carries out induction heating on the silicon steel plates at an intermediate frequency of 6-20 KHz, and the temperature measuring element 73 measures the temperature of the silicon steel plates 1 in real time. When the silicon steel plates 1 reach the target heating temperature, the induction heating coil 72 stops heating. The compacting force adjusting element 76 raises the compaction disk 74 to the initial position of the compaction disk 74, and the vertical displacement adjusting element 62 descends to its initial position. At that time, an unloading operation is completed.

(5) The horizontal movable plate 64 moves from a position directly below the induction heating station to the initial position of the horizontal movable plate 64, and the manipulator 52 takes out the stacking mold 2 and the silicon steel plates 1 from the stacking mold seat 65, and the cantilever beam 51 conveys the same to the conveying roller table 3. At that time, a discharging operation is completed.

Rapid induction heating and self-adhesive curing of the silicon steel plates 1 are accomplished by the above-mentioned steps, and the conveying roller table 3 continues operation, and the next round of treatment on silicon steel plates may be carried out by repeating the above-mentioned steps.

Specific Embodiment

Embodiment 1

The stack of silicon steel plates 1 used in this embodiment has an outer diameter of Φ120 mm an inner diameter of Φ40 mm, and a stack height of 130 mm. A compacting force in the direction of the stack height is set to 2-3 KN. The stack of silicon steel plates 1 enters the induction heating coil 72 to be heated, with a frequency of 10 KHz, for 5 minutes to reach 300° C., and is then cooled to room temperature.

Performance Test

An adhering fastening force test is performed on the stack of silicon steel plates by using a tension gauge. During the test, the silicon steel plate stack has one end face fixed to a test platform by a double-sided strong adhesive tape, and the other end face adhered to a tensile test end, which is connected with the tensile gauge, to stretch outward by means of a mechanical structure. During testing of the cured silicon steel plate core prepared by the technical solution of Embodiment 1, the tension gauge exceeds its range, maximally displaying 115 kgf, but the stack of silicon steel plates is still not pulled apart, which proves that the core prepared by the technical solution of the present invention has a good adhering effect.

By using a same testing method, adhesive forces of a riveted stack and a welded stack are tested for comparison. A riveted core is uniformly distributed with 12 riveting points, and the stacked core of silicon steel plates is pulled apart under a pulling force of 23 kgf. A welded core is circumferentially uniformly distributed with 6 welding seams, and the stacked core is pulled apart under the action of 25.5 kgf.

In summary, in the induction heating system for rapid curing of a silicon steel core with a self-adhesive coating of the present invention, by means of rapid induction heating at a medium frequency, a silicon steel core with a self-adhesive coating can be rapidly cured; for a silicon steel plate with an outer diameter less than Φ100 mm, the heating time may be as short as 1-5 min; for a silicon steel plate with an outer diameter of Φ100-300 mm, the heating time may be as short as 2-10 min; as compared with a core punched by a punching machine in the prior art, which generally needs to be heated for 1-4 hr to accomplish curing, the system greatly shortens the processing time, improves production efficiency, and facilitates automated operation in a production process of a silicon steel core with a self-adhesive coating. Moreover, the system can ensure the curing quality of core products, with adhering strength reaching 115 kgf or more, and can be widely applied to the field of the production of silicon steel cores with a self-adhesive coating.

It should be noted that the prior art part of the protection scope of the present invention is not limited to the embodiments provided in the application document, and all prior art that does not contradict the solution of the present invention, including but not limited to prior patent documents, prior publications, and prior public use, can be encompassed within the protection scope of the present invention.

In addition, combinations of various technical features in this case are not limited to combinations described in the claims in this case or combinations described in the specific embodiments. All technical features described in this case can be freely combined or incorporated in any way, unless contradictions are generated between each other.

It should also be noted that the embodiments listed above are only specific embodiments of the present invention. Obviously, the present invention is not limited to the above embodiments, and similar changes or modifications thereto can be directly obtained or easily conceived from the disclosure of the present invention by those skilled in the art, and should all fall within the protection scope of the present invention.

The invention claimed is:

1. An induction heating system for a silicon steel core with a self-adhesive coating, comprising:
   a conveying roller table, with a plurality of stacking molds being conveyed thereon, each of the stacking molds configured and dimensioned to receive stacked silicon steel plates therein;
   an induction heating device comprising a columnar induction heating coil with a hollow cavity and a temperature measuring element for measuring the temperature of the silicon steel plates, wherein the induction heating coil carries out induction heating on a silicon steel plate at a medium frequency of 6-20 KHz;
   a feeding and discharging device which conveys each of the plurality of stacking molds in a horizontal direction; and
   a loading and unloading device, which is configured to convey each of the stacking molds in the horizontal direction to a position directly below the induction heating coil, and convey the stacking mold in a vertical direction into the hollow cavity of the induction heating device and move each stacking mold out of the hollow cavity after the induction heating is completed;
   wherein the loading and unloading device comprises:
   a support;
   a vertical displacement adjusting element which is arranged on the support;
   a base plate which is connected to the vertical displacement adjusting element and driven by the vertical displacement adjusting element to move in the vertical direction;
   a horizontal movable plate which is arranged on the base plate, the horizontal movable plate being configured to slidably move in the horizontal direction relative to the base plate; and
   a stacking mold seat which is arranged on the horizontal movable plate for receiving a stacking mold.

2. The induction heating system according to claim 1, in which the feeding and discharging device comprises a cantilever beam extending in the horizontal direction, and a manipulator capable of walking along the cantilever beam.

3. The induction heating system according to claim 1, in which a conveying direction of the conveying roller table and a conveying direction of the feeding and discharging device are perpendicular to each other.

4. The induction heating system according to claim 1, in which the temperature measuring element is an infrared temperature measuring element.

5. The induction heating system according to claim 1, in which the temperature measuring element is arranged at a middle part of the induction heating coil.

6. The induction heating system according to claim 1, in which the stacking mold seat is provided with a pressure sensor.

7. The induction heating system according to claim 1, in which the induction heating device further comprises:
   a distance measuring element, which is arranged above the induction heating coil, wherein the distance measuring element detects a distance between the distance measuring element and the silicon steel plates inside the stacking mold; and based on a signal transmitted by the distance measuring element, a distance that the loading and unloading device conveys the stacking mold in the vertical direction is controlled, and a distance that a compaction disk moves in the vertical direction is controlled;
   a compacting force adjusting element, which is arranged above the induction heating coil; and the compaction disk, which is operatively connected to the compacting force adjusting element, wherein, under the adjustment of the compacting force adjusting element, the compaction disk moves vertically downward and applies a pressure to the silicon steel plates inside the stacking mold, or moves vertically upward to release the silicon steel plates.

8. An induction heating method for a silicon steel core with a self-adhesive coating in which induction heating is performed on silicon steel plates stacked inside a stacking mold utilizing the induction heating system according to claim 1.

9. The induction heating method for the silicon steel core with the self-adhesive coating according to claim 8, wherein an induction heating coil of the induction heating system is used to carry out induction heating on stacked silicon steel plates at a medium frequency of 6-20 KHz.

10. The induction heating method for the silicon steel core with the self-adhesive coating according to claim 9, comprising the following steps:
compacting the stacked silicon steel plates, carrying out induction heating by the induction heating coil on the stacked silicon steel plates at a medium frequency of 6-20 KHz,
measuring the temperature of the silicon steel plates in real time, and
stopping heating by the induction heating coil when the silicon steel plates reach a predetermined target temperature.

\* \* \* \* \*